3,005,021
PROCESS OF PREPARING ARYLAMINO ACIDS
Robert E. Miller, Dayton, Ohio, assignor to Monsanto Chemical Company, St. Louis, Mo., a corporation of Delaware
No Drawing. Filed Dec. 23, 1957, Ser. No. 704,349
8 Claims. (Cl. 260—518)

The present invention relates to methods of preparing amino acids and more particularly provides a new and improved process for the preparation of certain N-arylaminoalkanoic acids.

In prior art, said acids have been generally prepared by reacting aniline or a nuclearly substituted aniline with a chloroalkanoic acid whereby the N-arylaminoalkanoic acid was formed by dehydrochlorination condensation. Also, it has been reported by C. M. Suter and F. B. Dains (J. Amer. Chem. Soc., 50 2733–9 (1928)), that in attempts to prepare azoxybenzenes by reaction of 2-chloronitrobenezenes with sodium alcholates, there were obtained N-(o-chlorophenyl)aminoalkanoic acids instead of or in addition to the expected azoxybenzenes. Thus, they report the following reactions:

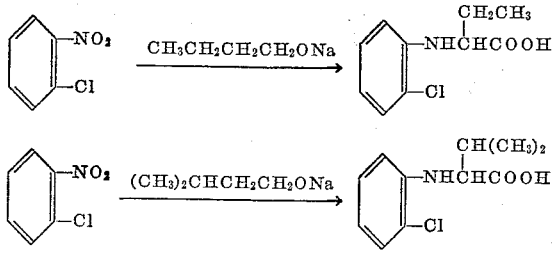

These investigators thus obtained N-aryl-α-aminoalkanoic acids wherein the number of carbon atoms corresponded to the carbon atoms of the alkoxide employed in the reaction. They concluded that only alkoxides of alcohols having the grouping —CH₂CH₂OH gave amino acids when reacted with nitrobenezenes having an ortho-halogen substituent. Isobutyl alcohol, (CH₃)₂CHCH₂OH, cinnamyl alcohol, (C₆H₅)₂CHCH₂OH and benzyl alcohol, C₆H₅CH₂OH, all compounds which lacked two hydrogens at the β-position with respect to the —OH groups, gave no amino acids when reacted with the ortho-substituted nitrobenzenes. Moreover, ethanol did not react to give aminoacids because the postulated, intermediately-formed aldehyde resinified. Since preparation of N-(ortho-halophenyl-glycines (having two carbon atoms in the alkanoic portion) required the use of the two carbon ethoxide, in accordance with the findings for n-butyl, isoamyl and β-phenethyl alcoholates set forth in the above reactions, said glycines could not be obtained by the Suter and Dain process.

Now I have found that N-(ortho-halo substituted aryl)-aminoalkanoic acids having fewer carbon atoms in the alkanoic portion of the molecule than the number present in the alkoxide which is employed with the ortho-halo substituted nitrobenzene are readily obtainable by employing alcoholates of a secondary alcohol having at least one β-methylene radical rather than of alcohols having the —CH₂CH₂OH grouping and conducting the reaction in the presence of the secondary alcohol. Thus, by using the alcoholate of 2-propanol with 2-chloronitrobenzene, I obtain N-2-chlorophenyl)glycine:

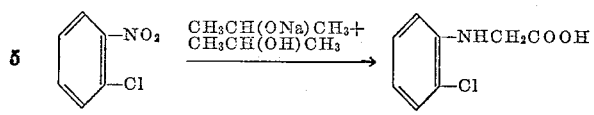

With 2-butanol instead of the 2-propanol, I also obtain N-(2-chlorophenyl)glycine:

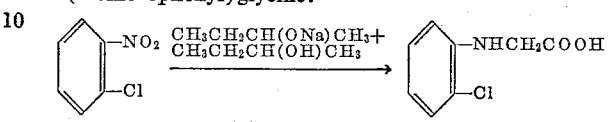

With the higher secondary alcohols, I likewise obtain N-(orthochloro substituted aryl)aminoalkanoic acids having fewer carbon atoms in the alkanoic portion than are present in the alkoxide which is employed; but, there is present an alkyl radical attached to the α-carbon thereof. Thus, sodium 3-pentylate reacts with 2-chloronitrobenzene to give N-(2-chlorophenyl)-α-alanine

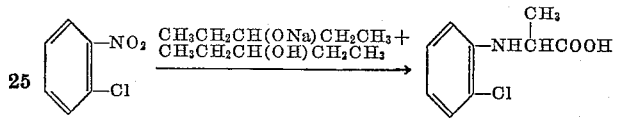

Here, as in the case of 2-butanol, there is formed an N-(aryl)-aminoalkanoic acid having two less carbon atoms in the alkanoic portion than the number present in the alkoxide employed. Sodium 2-octylate also reacts to give an acid having fewer carbon atoms in the alkanoic portion than are present in the alkoxide; but, as in the case of 2-propanol, the number of carbon atoms in the alkanoic portion is reduced by only one, thus:

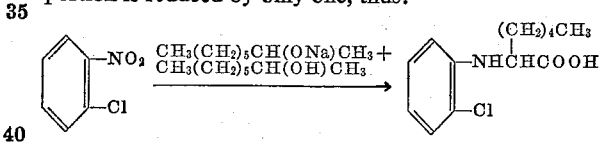

Reaction of the secondary alcoholate with the ortho-halo substituted nitrobenzene for the preparation of the N-(o-halophenyl)aminoalkanoic acids is preferably effected in the presence of the secondary alcohol from which the alcoholate has been derived. However, because the function of the alcohol is to provide the hydrogen which is required in a reducing agent, other alcohols may be used if a mixture of amino-acids as the product is not deemed to be undesirable. Generally, it is believed more expedient to employ, as the hydrogen-providing alcohol, the secondary alcohol which is that from which the alcoholate has been derived.

Ortho-halogen substituted nitrobenzenes which are employed for the production of the N-(chloroaryl)aminoalkanoic acids according to the process are, e.g., 2-chloronitrobenzene, 2,3-dichloronitrobenzene, 2,5-dichloronitrobenzene, 2,4-dichloronitrobenzene, 2,6-dichloronitrobenzene, 2,3,4-trichloronitrobenzene, 2,4,5-trichloronitrobenzene, 2,3,5-trichloronitrobenzene, 2,5,6-trichloronitrobenzene 2,3,4,5-tetrachloronitrobenzene, 2,4,5,6-tetrachloronitrobenzene, pentachloronitrobenzene, pentabromonitrobenzene, 2-bromonitrobenzene, 2,5-dibromonitrobenzene, 2,4-dibromonitrobenzene, 2,3,4-tribromonitrobenzene, 2,3-dibromonitrobenzene, 2-iodonitrobenzene, 2,3-diiodonitrobenzene, 2,4,5-triiodonitrobenzene, 2,3,4,5-tetraiodonitrobenzene, 2-chloro-5-bromonitrobenzene, 2,3-dichloro-4-iodonitrobenzene, etc. Presently useful alkoxides are the alkali metal alcoholates of secondary alcohols having from 3 to 18 carbon atoms and containing an α-methylene group, e.g., 2-propanol, 2-butanol, 3-pentanol, 2-pentanol, 2-hexanol, 2-octanol, ethyl propyl carbinol, 2-decanol, 2-hexadecanol and 2-octadecanol. Either the sodium, potassium or lithium alcoholates may be employed.

Preparation of the N-(ortho-halogen substituted phenyl)-aminoalkanoic acids according to the present process is generally conducted as follows:

The alkoxide is prepared by treating a secondary alcohol of from 3 to 18 carbon atoms with the alkali metal or a hydride, or hydroxide thereof in known manner. When the alkoxide is prepared by use of an alkali metal hydroxide, whereby water is formed as by-product, the alkoxide is separated from the reaction mixture and dried previous to its use with the ortho-halo substituted nitrobenzene with which it is to be employed. When the alkoxide is prepared by a means which does not involve formation of water, e.g., by treatment of the alcohol with an alkali metal or an alkali metal hydride, it is convenient to effect the alkoxide-forming reaction in the presence of an excess of the alcohol, whereby the unreacted alcohol is present for use in the subsequent reaction with the ortho-halo substituted nitrobenzene. As is known to the art, depending upon the nature of the alkali metal compound employed, in order to assure completion of alkoxide formation, it may be necessary to employ an extraneous, inert diluent, e.g., benzene or xylene, in order to facilitate operation at sufficiently high refluxing temperatures and to remove moisture. Such an extraneous diluent also need not be separated from the alkoxide previous to reaction with the ortho-halo substituted nitrobenzene, for it serves as a diluent also for the latter reaction. A hydrogen acceptor, e.g., a carbonyl compound such as diethyl ketone, methyl ethyl ketone or any ketone or aldehyde derived from the charged alcohol is advantageously employed in order to obtain better conversion of the nitro compound to the amino acid.

For the formation of the N-(halophenyl)aminoalkanoic acid, at least one molar equivalent of the alkoxide per mole of the halogenated nitrobenzene is required, but these reactants are most advantageously employed in a 2:1 molar proportion. In order to assure good conversion of the nitrobenzene an excess of the alcohol corresponding to the alkoxide is generally preferred.

The alkoxide and the secondary alcohol from which it is derived are contacted with the ortho-halo substituted nitrobenzene in the presence or absence of an inert diluent or solvent and the resulting mixture is heated at a temperature of, say, from 50° C. to the refluxing temperature of the mixture until formation of the N-(halophenyl)aminoalkanoic acid has occurred. Although the reaction may be effected by operating in the absence of an inert diluent or solvent, for optimum conversion and ease in manipulation, the presence of an inert liquid as a diluent or solvent is recommended. Conveniently, the halonitrobenzene is added to the alkoxide-alcohol mixture in the form of a solution, e.g., in an aliphatic or aromatic hydrocarbon solvent such as hexane, benzene, toluene or xylene, or in a cyclic ether such as dioxane.

The N-(halophenyl)aminoalkanoic acid is readily recovered from the reaction mixture by removing any diluent or unreacted material, e.g., by extraction or distillation. The acid product in the form of its alkali metal salt is generally water-soluble and is thus separable from other organic material simply by washing with water. The free acid is then obtained by hydrolyzing the salt, e.g., by acidifying its aqueous solution, and filtering the resulting organic acid or by extracting the organic material, i.e., the amino-acid, with a readily volatilizable solvent, e.g., ether, and evaporating off the solvent.

While the present process provides a means of obtaining the N-(ortho-halo substituted phenyl)aminoalkanoic acids generally, some of which compounds have been prepared by prior processes, it also provides certain new compounds of this class which have not been previously prepared. Particularly valuable of the presently provided new compounds is N-(2,5-dichlorophenyl)glycine which possesses biological toxicant activity and is an outstanding herbicide. 2-(2,5 - dichloroanilino)heptanoic acid, another previously unknown compound, also possesses biological toxicant action, generally, and is characterized by high fungicidal activity. Both of these compounds are readily converted to nitroso compounds of use as rubber modifying agents and to esters having rubber softening effects.

The invention is further illustrated, but not limited, by the following examples:

Example 1

The sodium alcoholate of diethyl carbinol was prepared by adding 9.2 g. of sodium hydride to 90 cc. of the carbinol in small portions, and refluxing the resulting mixture on a steam bath with 250 cc. of benzene until complete formation of the alkoxide had occurred. There was then added 19.5 g. (0.1 mole) of 2,5-dichloronitrobenzene in 50 cc. of benzene during a period of 30 minutes while maintaining the temperature of the reaction mixture at 50–52° C. Toward the end of the addition, the mixture became very viscous. The whole was heated on a steam bath for 2 hours at 73–75° C., and allowed to attain room temperature. After washing the cooled reaction mixture first with water, then with aqueous sodium carbonate, and finally with water, the washed product was extracted with ether. The combined ether extracts comprised neutral organic materials, whereas the aqueous residue comprised the amino acid salt. Upon acidifying the aqueous portion, 12.4 g. of N-(2,5-dichlorophenyl)-α-alanine separated out. Based on the 2,5-dichloronitrobenzene, this represented a 52.9% conversion to the alanine compound. A recrystallized (benzene) sample of the N-(2,5-dichlorophenyl)-α-alanine thus obtained, melted at 160–161.5° C.

Example 2

To 80 cc. of 2-propanol, there was gradually added, with stirring, 7.5 g. of sodium hydride (0.31 atom as Na) and the resulting mixture was heated on the steam bath until alkoxide formation was completed. There was then added 300 cc. of benzene and the whole allowed to attain a temperature of 28° C. Reaction of the thus-obtained benzene solution of the alkoxide with 2,5-dichloronitrobenzene was effected by adding, dropwise thereto, a solution of 19.2 g. (0.1 mole) of the dichloronitrobenzene in 100 cc. of benzene while slowly bringing the temperature of the reaction mixture to 35–37° C., during the addition, and refluxing subsequently at a temperature of 75° C. on the steam bath for 1.5 hours. The resulting reaction mixture was then allowed to cool, washed with water and extracted with ether. The aqueous residue was acidified to a pH of approximately 2 and the solids which precipitated out were filtered and dried. Based on the dichloronitrobenzene, the weight of the dried solids (4.8 g.) represented a 21.8% conversion. Recrystallization of the solids from benzene gave the substantially pure N-(2,5-dichlorophenyl)glycine, M.P. 174–175° C.

Example 3

2-butanol (150 cc., 1.6 moles) was treated with 10.5 g. of sodium hydride (0.4 atom as Na), and 400 cc. of benzene was added to the resulting mixture. The whole was then treated, dropwise, with a solution of 38.5 g. (0.2 mole) of 2,5-dichloronitrobenzene in 60 cc. of benzene while controlling the temperature of the mixture at 30–36° C. After addition of the dichloronitrobenzene solution had been completed, the mixture was stirred for one hour and then refluxed (79–80° C.) for 2 hours. The reaction product was then allowed to cool, washed with water and extracted with ether. Upon acidifying the residual aqueous solution, the crude N-(2,5-dichlorophenyl)glycine (12.6 g.), M.P. ca. 175° C., separated therefrom. Repeated recrystallization from benzene gave the substantially pure product, M.P. 174–175° C., having a neutralization equivalent of 222 as compared with 220, the calculated value for $C_8H_7Cl_2NO_2$, and analyzing as follows:

|  | Found | Calcd. for $C_8H_7Cl_2NO_2$ |
|---|---|---|
| Percent C | 43.92 | 43.70 |
| Percent H | 3.49 | 3.18 |
| Percent N | 6.82 | 6.37 |

*Example 4*

To 80 cc. (1.03 mole) of 2-propanol, there was gradually added 10.5 g. of sodium hydride (10.1 g. as Na, 0.43 atom), and the mixture was refluxed on the steam bath until formation of sodium 2-propoxide was complete. To the reaction mixture there was then added 275 cc. of benzene and subsequently, a solution consisting of 19.2 g. (0.1 mole) of 2,5-dichloronitrobenzene in 150 cc. of benzene during a period of 1.25 hours at a temperature of 26–38° C. Refluxing was noted as the reaction temperature rose to 36–37° C., and decreased as reaction progressed. The whole was heated, with stirring, for 2 hours at 78° C. after addition of said solution was concluded. Water was added to the reaction mixture and the aqueous layer was extracted with ether. The aqueous portion was then acidified with dilute hydrochloric acid to a pH of above 2. The solids which crystallized out were filtered and dried to give 4.5 g. of the substantially pure N-(2,5-dichlorophenyl)glycine. This represented a 20.4% conversion to the glycine compound based on the 2,5-dichloronitrobenzene.

*Example 5*

The alcoholate of 2-octanol was prepared by treating the octanol (90 cc., 0.56 mole) gradually with 9.1 g. (0.38 mole) of sodium hydride, and refluxing the resulting mixture for 2.5 hours. At the end of this time, 25 cc. of benzene was added to the mixture and the resulting mixture was cooled to 50° C. To the cooled material, there was added a solution of 19.2 g. (0.1 mole) of 2,5-dichloronitrobenzene in 50 cc. of benzene over a period of 30 minutes at a temperature of 53–55° C. After refluxing the whole on the steam bath for 2 hours, the reaction mixture was cooled and extracted first with water, then with aqueous sodium carbonate, and finally again with water. After extracting the washed material with ether and acidifying the aqueous portion with dilute hydrochloric acid, the acidified product was again extracted with ether and the residue evaporated to dryness. From the resulting oily material, upon standing, there were obtained crystals of the crude 2(2,5-dichloroanilino)heptanoic acid. Recrystallization from benzene gave the white rods of the purer product, M.P. 115–117° C., having a neutralization equivalent of 288 as compared with 290, the calculated value for $C_{13}H_{17}Cl_2NO_2$, and analyzing as follows:

|  | Found | Calcd. for $C_{13}H_{17}Cl_2NO_2$ |
|---|---|---|
| Percent C | 53.80 | 53.68 |
| Percent H | 5.86 | 6.24 |
| Percent N | 4.83 | 5.22 |

The quantity of the 2-(2,5-dichloroanilino)heptanoic acid obtained amounted to a 20.5% conversion, based on the 2,5-dichloronitrobenzene.

*Example 6*

2-octanol (90 cc.) was gradually treated with 9.5 g. of sodium hydride at a temperature of 80–83° C. After refluxing the resulting mixture for 24 hours, 250 cc. of benzene was added thereto and refluxing was continued for an additional 8 hours. The whole was cooled to 50° C., and to the cooled mixture there was added a solution consisting of 19.2 g. of 2,5-dichloronitrobenzene in 50 cc. of benzene. The resulting mixture was refluxed on the steam bath for 3 hours, and then treated with water. The resulting organic layer was washed with aqueous sodium carbonate and then with water, and the washings combined with the aqueous layer. This combined aqueous material was acidified and extracted with ether. Evaporation of the ether extract gave as residue 7.0 g. of the crude 2-(2,5-dichloroanilino)heptanoic acid. Recrystallization from benzene gave the purer product, M.P. 114–116° C.

*Example 7*

This example describes the preparation of N-(2-chlorophenyl)α-alanine from 2-chloronitrobenzene and diethyl carbinol.

The alkoxide was prepared by gradually adding 9.5 g. of sodium hydride to 80 cc. of the carbinol and refluxing the resulting mixture on the steam bath for 2 hours. To the alkoxide, there was first added 250 cc. of benzene and subsequently, over a period of 30 minutes at a temperature of 53–55° C., a solution consisting of 15.8 g. of 2-nitrochlorobenzene in 50 cc. of benzene. When addition of the solution had been completed, the reaction mixture was reddish-brown and gelatinous. The whole was refluxed on the steam bath for 2 hours after addition of the 2-chloronitrobenzene solution had been completed, and the resulting reaction mixture stirred with 250 cc. of water for 15 minutes. It was then extracted first with water, then with aqueous sodium carbonate, and finally again with water. The aqueous material was then extracted with ether and the aqueous portion acidified. From the acidified aqueous solution, 6.9 g. of the crude N-(2-chlorophenyl)-α-alanine crystallized out. The mother liquors were extracted with ether and the ether evaporated from the extract. The resulting residue was filtered and dried to give an additional 2.9 g. of the N-(2-chlorophenyl)-α-alanine. Based on the 2-chloronitrobenzene, this represented a 49.4% conversion to the amino acid.

*Example 8*

Diethyl carbinol (50 cc., 40.8 g., 0.46 mole) was gradually treated with 5.0 g. of sodium hydride (4.8 g. as sodium, 0.028 mole) and the mixture refluxed on the steam bath until formation of the sodium alcoholate was complete. There was then added a solution consisting of 15.7 g. (0.1 mole) of 2-chloronitrobenzene in 50 cc. of benzene during a period of 30 minutes at a temperature of 51–54° C. The whole was refluxed on the steam bath at 70–80° C. for 2 hours, cooled and extracted with water and aqueous sodium carbonate. Acidification of the aqueous material gave 5.8 g. of N-(2-chlorophenyl)-α-alanine which precipitated out, and an additional 3.8 g. of the amino acid was obtained by extracting the mother liquors with ether, triturating with water, filtering and drying. This represents a 48.2% conversion of the 2-chloronitrobenzene.

*Example 9*

Diethyl carbinol (80 cc.) was treated with 6.0 g. of sodium hydride, 250 cc. of benzene was added and the whole was refluxed until formation of the sodium alcoholate was complete. When the temperature of the reaction mixture was 80° C., there was added a solution of 15.7 g. (0.1 mole) of 2-chloronitrobenzene and 50 cc. of benzene during a period of 20 minutes. The whole was refluxed on the steam bath for 2 hours. Washing with water and aqueous sodium carbonate, as in Example 8, gave 5.4 g. of N-(2-chlorophenyl)-α-alanine from the aqueous portion, and another 4.6 g. was obtained by working up the mother liquors with ether as in Example 8. This represented a conversion of 50.3% of the 2-chloronitrobenzene to the amino acid.

*Example 10*

2-butanol (37 cc., 33.5 g., 0.55 mole) was gradually treated with 6.0 g. of sodium hydride and refluxed. During the refluxing, a total of 100 cc. of benzene was added to the mixture as needed to effect homogeneity. After alkoxide formation was complete, there was gradually added at a temperature of 53° C., a solution of 15.7 g. (0.1 mole) of 2-chloronitrobenzene in 150 cc. of benzene. The whole was then refluxed for 2 hours, hydrolyzed with 800 cc. of water, extracted with aqueous sodium carbonate, and the aqueous layer acidified. The acidified material was then extracted with ether and the ether evaporated from the extract. There was then obtained as residue 6.8 g. of the substantially pure N-(2-chlorophenyl)glycine. Recrystallization from benzene gave the purer product, M.P. 171–173° C., having a neutralization equivalent of 186, as compared with 185.5, the theoretical value.

*Example 11*

A mixture consisting of 50 cc. diethyl carbinol and 5.5 g. (0.20 mole as Na) of sodium hydride was refluxed for formation of sodium 3-pentylate and 150 cc. of benzene was added. When the temperature of the resulting mixture had attained 50–55° C., there was added a solution consisting of 15.7 g. (0.1 mole) of 2-nitrochlorobenzene and 8.6 g. (0.1 mole) diethyl ketone in 50 cc. of benzene. After addition was completed, the whole mixture was refluxed for 2 hours, the reaction mixture was extracted with water and the aqueous extract was acidified. Precipitated acid amounted to 6.8 g. Extraction of the acidified product with ether, and distillation of the extract to remove solvents, gave as residue a product from which, upon standing, there separated out 5.2 g. of acids, which on recrystallization gave the substantially pure N-(2-chlorophenyl)-α-alanine, M.P. 160–162° C. Based on the 2-chloronitrobenzene, a 60.3% conversion to the alanine compound was obtained.

*Example 12*

Herbicidal effect of N-(2,5-dichlorophenyl)glycine against buckwheat, rye grass and wild oat was determined by spraying the potted, 3-week old seedlings to run-off with an 0.5% aqueous dispersion of the compound, and maintaining the sprayed plants in the green house under ordinary conditions of sunlight and watering for 2 weeks. Observation of the plants at the end of that time showed the buckwheat to be completely killed, whereas the rye grass and the wild oat appeared to be only very slightly harmed.

When employed as biological toxicants, N-(2,5-dichlorophenyl)glycine, N - (2,5 - dichlorophenyl) - α-alanine and 2-(2,5-dichloroanilino)heptanoic acid are advantageously applied in admixture with either an inert liquid or pulverized solid, e.g., pumice or bentonite, as carrier, since these compounds are effective in only very small concentrations. Oil-in-water emulsions or aqueous dispersions of the acids are particularly useful.

As will be apparent to those skilled in the art, many variations of the process herein described and in applications of the compounds provided thereby may be employed, the present invention being limited only by the appended claims.

What I claim is:

1. The process which comprises heating an ortho-halogen substituted nitrobenzene of the formula

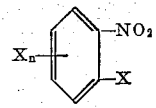

in which X is a halogen selected from the class consisting of chlorine, bromine and iodine and $n$ denotes a number of 0 to 4, with an alkali metal alcoholate of a secondary alkanol of from 3 to 18 carbon atoms and having at least one α-methylene group, in the presence of a secondary alkanol having from 3 to 18 carbon atoms and an inert liquid diluent at a temperature of from 50° C. to refluxing, and recovering from the resulting reaction product an N-(o-halophenyl)aminoalkanoic acid wherein the halogen is as above defined, wherein there are present from 1 to 5 of said halogen atoms attached to the phenyl ring and wherein there are present fewer carbon atoms in the alkanoic portion of the molecule than are present in said alcoholate.

2. The process which comprises refluxing 2-chloronitrobenzene with the sodium alcoholate of a secondary alkanol of from 3 to 18 carbon atoms and having at least one α-methylene group, in the presence of a secondary alkanol having from 3 to 18 carbon atoms and an inert liquid diluent, and recovering from the resulting reaction product an N-(2-chlorophenyl)aminoalkanoic acid having fewer carbon atoms in the alkanoic portion of the molecule than are present in said alcoholate.

3. The process which comprises refluxing 2,5-dichlornitrobenzene with the sodium alcoholate of a secondary alkanol of from 3 to 18 carbon atoms and having at least one α-methylene group, in the presence of a secondary alkanol having from 3 to 18 carbon atoms and an inert liquid diluent, and recovering an N-(2,5-dichlorophenyl)aminoalkanoic acid having fewer carbon atoms in the alkanoic portion of the molecule than are present in said alcoholate.

4. The method which comprises refluxing a mixture consisting of 2,5-dichloronitrobenzene, the sodium alcoholate of 2-propanol and 2-propanol in benzene as diluent, and recovering N-(2,5-dichlorophenyl)glycine from the resulting reaction product.

5. The method which comprises refluxing a mixture consisting of 2,5-dichloronitrobenzene, the sodium alcoholate of a diethyl carbinol and diethyl carbinol in benzene as diluent, and recovering N-(2,5-dichlorophenyl)-α-alanine from the resulting reaction product.

6. The method which comprises refluxing 2,5-dichloronitrobenzene with the sodium alcoholate of 2-octanol and 2-octanol in benzene as diluent, and recovering 2-(2,5-dichloroanilino)heptanoic acid from the resulting reaction product.

7. The method which comprises refluxing a mixture consisting of 2-chloronitrobenzene, the sodium alcoholate of 2-butanol and 2-butanol in benzene as diluent, and recovering N-(2-chlorophenyl)glycine from the resulting reaction product.

8. The method which comprises refluxing a mixture consisting of 2-chloronitrobenzene, the sodium alcoholate of diethyl carbinol and diethyl carbinol in benzene as diluent, and recovering N-(2-chlorophenyl)-α-alanine from the resulting reaction product.

References Cited in the file of this patent

UNITED STATES PATENTS 2,322,761   Lontz _____ June 29, 1943

OTHER REFERENCES

Thompson et al.: Chem. Absts., vol. 41, Col., 3909d (1947).

Suter et al.: J.A.C.S., vol. 50, pps. 2733–9 (1928).

UNITED STATES PATENT OFFICE
CERTIFICATE OF CORRECTION

Patent No. 3,005,021                            October 17, 1961

Robert E. Miller

It is hereby certified that error appears in the above numbered patent requiring correction and that the said Letters Patent should read as corrected below.

Column 1, line 41, for "nitrobenezenes" read -- nitrobenzenes --; line 47, for "amin-" read -- amino- --; line 50, for "phenyl-glycines" read -- phenyl)glycines --; same column 1, line 62, for "β-methylene" read -- α-methylene --; column 2, line 2, for "N-2-chlorophenyl)glycine" read -- N-(2-chlorophenyl)glycine --.

Signed and sealed this 3rd day of April 1962.

(SEAL)
Attest:

ERNEST W. SWIDER                            DAVID L. LADD
Attesting Officer                              Commissioner of Patents